UNITED STATES PATENT OFFICE 2,157,524

PREPARATION OF CHLORINE MONOXIDE

George H. Cady, Wadsworth, Ohio, assignor to Pittsburgh Plate Glass Company, Allegheny County, Pa., a corporation of Pennsylvania No Drawing. Application February 15, 1938, Serial No. 190,618

16 Claims. (Cl. 23—152)

This invention relates to the preparation of chlorine monoxide.

In accordance with my invention, I have found that chlorine monoxide may be produced by subjection of alkali metal carbonates and bicarbonates to the action of chlorine in a manner hereinafter more fully set forth. Particularly effective results may be obtained by treatment of sodium carbonate with chlorine.

I have found that when chlorine is passed into contact with sodium carbonate, a substantial quantity of chlorine monoxide is produced. In general, it is found preferable to maintain the presence of a small amount of water in order to secure satisfactory yields of chlorine monoxide. On the other hand, the presence of water in excess appears to be undesirable since hypochlorous acid rather than chlorine monoxide is apparently formed in such cases. In order to secure satisfactory yields, it is found desirable to form chlorine monoxide by treatment of a solid alkali metal carbonate or bicarbonate containing water of hydration. Thus, the decahydrate of sodium carbonate, which contains 63 per cent water, when subjected to the action of chlorine at temperatures below the melting point thereof, yields substantial quantities of chlorine monoxide. In a similar manner, the monohydrate containing approximately 15 per cent of water may also be employed with considerable success. Most efficient results appear to be obtained when the water content of the carbonate does not substantially exceed 15 per cent; approximately 10 per cent being the optimum concentration. Very concentrated solutions of these carbonates may be treated in this manner with evolution of chlorine monoxide but, in general, the yields are found to be low, a substantial amount of chlorine being consumed in the production of chlorates.

Since the action of the water is apparently catalytic, very low concentrations or traces thereof, appear to assist the reaction. However, small amounts of water may evaporate during the reaction and since the presence of some water is, in general, required for efficient operation, it is preferred to maintain a substantial amount of water present in the carbonate. If desired, the evaporated water may be replaced by introduction of steam or water vapor into the reaction zone continuously or from time to time. By one very effective method, I may maintain sufficient moisture within the reaction chamber to prevent substantial increase or decrease in the water content of the carbonate. This may be done in suitable manner as, for example, by periodically or continuously introducing a predetermined amount of steam or water vapor into the reaction zone during chlorination or by bubbling chlorine gas through water, maintained at a given temperature, before the chlorine is introduced into the reaction chamber.

The temperature of chlorination is preferably maintained at or near room temperature (approximately 20–30° C.) in order to secure maximum yield although temperatures as high as 200° C. may be used under some conditions. When hydrates of sodium carbonate are being chlorinated, treatment above 112° C. does not appear to be desirable due to the rapidity with which these hydrates lose water at this temperature. By maintaining sufficient moisture in the reaction zone, however, it is possible to operate at higher temperatures. Chlorination at temperatures down to 0° C. also yields successful results. It is also found that chlorine monoxide may be produced in substantial quantities by subjecting carbonates or bicarbonates to the action of chlorine in the absence of water. This is especially true of the alkali metal bicarbonates which are capable of dissociating and permit evolution of water during the reaction. In addition, by operation, at high temperatures, generally, in excess of 150° C., and preferably in the neighborhood of 200° C., chlorine monoxide may be obtained.

Agitation or grinding of the sodium carbonate may assist the reaction by abrading the reacted material from the surface thereof and continually exposing fresh carbonate surface to the action of the chlorine. This may be done, for example, by suspending the carbonate in a gaseous or liquid diluent such as carbon dioxide or carbon tetrachloride and grinding by suitable means such as a ball or colloid mill.

The chlorine is preferably diluted with convenient gaseous or liquid diluents such as air, nitrogen, carbon dioxide, carbon tetrachloride and the like. The presence of such diluents appears to cause an increase in the yield of chlorine monoxide produced from a given amount of chlorine and has the additional function of minimizing the possibility of explosions. Gases containing up to 25 per cent chlorine are found to be most suitable. Carbon dioxide which is evolved during the reaction may be used as the diluent. By regulating the concentration of chlorine in the gas entering the reaction zone, I may readily control the rate and degree of completion of the reaction.

It is preferred to pass the chlorinating gas through the reaction zone at such a rate that not substantially in excess of 25-35 per cent of the chlorine is converted into chlorine monoxide. The treated gas, after removal from the reaction zone, contains substantial quantities of chlorine, chlorine monoxide, carbon dioxide and other diluents. It may be treated to recover chlorine monoxide in a convenient manner, for example, by treatment in water. I have found that chlorine monoxide is more readily soluble than chlorine in an aqueous medium and that by contacting the chlorine-chlorine monoxide-containing gas with water a substantial separation of the two substances may be secured. Thus, by bubbling the gas obtained from the chlorination of the alkali metal carbonates or bicarbonates through water, or by countercurrently flowing water and the gaseous mixture in convenient apparatus such as a bubble tower, I may recover substantially all the chlorine monoxide produced. The undissolved gas containing chlorine and the insoluble diluents may then be recycled with or without additional chlorine to produce further quantities of chlorine monoxide. By this means, it is possible to produce aqueous solutions of hypochlorous acid of high concentrations in excess of 10-20 per cent while avoiding the presence of chlorine monoxide in explosive concentrations.

If desired, the chlorine monoxide may be produced by subjection of an alkali metal carbonate or bicarbonate to the action of a carbon tetrachloride solution of chlorine. The chlorine and chlorine monoxide may then be separated by shaking the carbon tetrachloride solution with water. In this manner, the chlorine monoxide is dissolved by the water and the chlorine solution may be recycled.

The chlorination may be carried out in any convenient apparatus. In order to secure intimate contact between the chlorine and the carbonate, it is preferred to resort to a countercurrent treatment using agitation or grinding as previously set forth. However, the treatment may be carried out in batches or by other convenient means.

The following examples are illustrative:

*Example I.*—A gaseous mixture consisting of 648 parts by volume of carbon dioxide and 82 parts by volume of chlorine gas was humidified by bubbling through water at 16° C. This mixture of gases was then fed with agitation through a rotating tubular reaction chamber about 9 feet long at the rate of approximately 375 liters per hour of the mixture per square inch of cross sectional area of the tube. During flow of gases through the tube, they contacted countercurrently a stream of dry soda ash (mono-hydrate) flowing at a rate of 25.6 grams per hour of solid material per sq. inch of cross sectional area of the tube. During reaction, the atmospheric temperature around the reaction chamber was maintained at 30°±1° C. The gases which were removed from the tube contained about 1.35 per cent of chlorine monoxide by volume and approximately 75 per cent of the chlorine originally present. Chlorine monoxide was recovered from the gaseous mixture by bubbling the latter through water at 0° C. A relatively concentrated solution of hypochlorous acid containing 196 grams of acid per liter was obtained.

*Example II.*—18.9 kg. of soda ash containing 10.1 per cent of water as water of crystallization were stirred vigorously for 4 minutes with 350 liters of a solution of chlorine in carbon tetrachloride having a dissolved chlorine content of 73.5 grams per liter. A solution containing approximately 22 grams per liter of chlorine monoxide was produced with a yield based upon the chlorine consumption of about 90 per cent. The reaction was discontinued at the end of the 4 minute period in order to prevent further reaction of the absorbed chlorine monoxide with the solid, by filtration of the mixture.

While the invention has been described with particular reference to sodium carbonates, the process has been found to be operative using other carbonates or bicarbonates of the alkali metals. Thus, lithium or potassium carbonate or bicarbonate may be chlorinated in accordance with my invention to produce chlorine monoxide.

Although the invention has been described with reference to the specific details of certain embodiments thereof, it is not intended that such details shall be regarded as limitations upon the scope of the invention.

By the term "hydrated compound" and "hydrated sodium carbonate" in the following claims, I mean to include solid carbonates or bicarbonates of the alkali metals containing water, physically or chemically combined with the solid regardless of whether the product be a true hydrate or not.

Reference is made to my copending case Ser. No. 216,475, filed June 29, 1938, which is related similar subject matter.

I claim:

1. A process of preparing chlorine monoxide which comprises contacting a solid compound of the group consisting of the carbonates and bicarbonates of the alkali metals, with sufficient chlorine and at a temperature sufficiently high to cause evolution of gaseous chlorine monoxide.

2. A process of preparing chlorine monoxide which comprises contacting solid sodium carbonate with sufficient chlorine and at a temperature sufficiently high to cause evolution of gaseous chlorine monoxide.

3. A process of preparing chlorine monoxide which comprises contacting a compound of the group consisting of the carbonates and bicarbonates of the alkali metals, with sufficient chlorine in the presence of an amount of water sufficient to cause substantial evolution of chlorine monoxide the amount of water present being insufficient to dissolve a major portion of the chlorine monoxide evolved.

4. A process of preparing chlorine monoxide which comprises contacting sodium carbonate with sufficient chlorine in the presence of an amount of water sufficient to cause substantial evolution of chlorine monoxide the amount of water present being insufficient to dissolve a major portion of the chlorine monoxide evolved.

5. A process of preparing chlorine monoxide which comprises contacting a solid compound of the group consisting of the carbonates and bicarbonates of the alkali metals with chlorine in the presence of a quantity of water insufficient to dissolve a substantial portion of said solid.

6. A process of preparing chlorine monoxide which comprises contacting solid sodium carbonate with chlorine in the presence of a quantity of water insufficient to dissolve a substantial portion of said carbonate.

7. A process of preparing chlorine monoxide which comprises contacting solid sodium carbonate with sufficient chlorine and an inert diluent to cause evolution of gaseous chlorine monoxide and maintaining the temperature of reaction not substantially less than 150° C. during at least a portion of the period.

8. A process of preparing chlorine monoxide which comprises contacting a solid compound of the group consisting of the hydrated carbonates and bicarbonates of the alkali metals with gaseous chlorine and maintaining the water content of the gaseous chlorine in contact with said compound sufficiently high to prevent substantial dehydration of said compound.

9. A process of preparing chlorine monoxide which comprises contacting solid hydrated sodium carbonate with gaseous chlorine and maintaining the water content of the gaseous chlorine in contact with said sodium carbonate sufficiently hhig to prevent substantial dehydration of said carbonate.

10. A process of preparing chlorine monoxide which comprises contacting a solid compound of the group consisting of carbonates and bicarbonates of the alkali metals, with a mixture of chlorine and a diluent, said mixture containing up to 25 per cent chlorine, in the presence of sufficient water to cause substantial evolution of chlorine monoxide the amount of water present being insufficient to dissolve a major portion of the chlorine monoxide evolved.

11. A process of preparing chlorine monoxide which comprises contacting solid sodium carbonate with a mixture of chlorine and a diluent, said mixture containing up to 25 per cent chlorine, in the presence of sufficient water to cause substantial evolution of chlorine monoxide the amount of water present being insufficient to dissolve a major portion of the chlorine monoxide evolved.

12. A process of preparing chlorine monoxide which comprises contacting a compound consisting of the hydrated carbonates and bicarbonates of the alkali metals with a solution of chlorine in carbon tetrachloride.

13. A process of preparing chlorine monoxide which comprises contacting hydrated solid sodium carbonate with sufficient chlorine to cause evolution of chlorine monoxide, the amount of water present in said hydrated carbonate being not substantially in excess of 15 per cent by weight of said solid.

14. A process of preparing chlorine monoxide which comprises contacting solid sodium carbonate with chlorine at a temperature not substantially less than 150° C.

15. A process of preparing chlorine monoxide which comprises contacting a solid bicarbonate of the alkali metals with sufficient chlorine to cause evolution of chlorine monoxide.

16. The process of claim 15 wherein the bicarbonate used is sodium bicarbonate.

GEORGE H. CADY.